United States Patent [19]
Schmidt et al.

[11] Patent Number: 5,473,163
[45] Date of Patent: * Dec. 5, 1995

[54] GAS DETECTOR FOR X-RAYS

[75] Inventors: Martin Schmidt, Emskirchen; Claus Pohan, Baiersdorf, both of Germany

[73] Assignee: Siemens Aktiengesellschaft, Munich, Germany

[*] Notice: The portion of the term of this patent subsequent to Aug. 22, 2012, has been disclaimed.

[21] Appl. No.: 303,828

[22] Filed: Sep. 9, 1994

[30] Foreign Application Priority Data

Nov. 26, 1993 [DE] Germany .......................... 43 40 389.1

[51] Int. Cl.$^6$ .............................. G01T 1/185; G01T 1/29
[52] U.S. Cl. ................................................. 250/385.1
[58] Field of Search ................... 250/374, 385.1

[56] References Cited

U.S. PATENT DOCUMENTS

| | | |
|---|---|---|
| 4,055,767 | 10/1977 | Allemand . |
| 4,161,655 | 7/1979 | Cotic et al. .......................... 250/385.1 |
| 4,260,891 | 4/1981 | Williams .............................. 250/385.1 |
| 4,306,155 | 12/1981 | Cotie . |
| 4,367,409 | 1/1983 | Klausz ................................. 250/385.1 |
| 4,496,841 | 1/1985 | Pritzkow et al. ................. 250/385.1 X |
| 4,625,117 | 11/1986 | Hayakawa et al. ................. 250/385.1 |

FOREIGN PATENT DOCUMENTS 4035696  5/1992  Germany .

*Primary Examiner*—Carolyn E. Fields
*Assistant Examiner*—Edward J. Glick
*Attorney, Agent, or Firm*—Hill, Steadman & Simpson

[57] ABSTRACT

A gas detector for x-rays can be easily taken apart for repair and service. The gas detector has plate-shaped electrodes which are plugged into spring contacts, the spring contacts being connected in groups to a conductor foil which is connected by means of contact projections to a printed circuit board. The printed circuit board carries electronic components for processing detector signals from the electrodes.

1 Claim, 2 Drawing Sheets

GAS DETECTOR FOR X-RAYS

BACKGROUND OF THE INVENTION

1. Field of the Invention

The present invention is directed to a gas detector for x-rays, particularly a gas detector of the type utilized in computer tomography systems.

2. Description of the Prior Art

Gas detectors for detecting x-rays in computer tomography system, particularly xenon detectors, are known in the art which include a row or series of plate-shaped electrodes arranged in a gas-tight chamber. In known gas detectors of this type, the signals are supplied from the electrodes to a detector circuit by means of wires which are electrically conductively connected to the electrodes and which are conducted to the exterior of the gas-tight chamber. Because of the hard-wired connection of the wires to the plate-shaped electrodes, servicing and repair of known gas detectors of this type is difficult if one of the electrodes must be removed.

SUMMARY OF THE INVENTION

It is an object of the present invention to provide a gas detector for x-rays which has components arranged and mounted in a manner to permit easy repair and service of the gas detector.

The above object is achieved in accordance with the principles of the present invention in a gas detector wherein the electrodes are plugged into spring contacts, and thus can be easily individually removed without having to sever any wires. Such a removal is possible by the electrodes being inserted into slots of retaining members for mechanically holding the electrodes. The spring contacts are connected group-by-group to a conductor foil which is electrically conductively connected by means of contact projections ("nubs") to a printed circuit board which carries electronic components for processing the detector signals. The detector signals are thereby transmitted via the interconnects on the printed circuit board to the electronic components.

DESCRIPTION OF THE PREFERRED EMBODIMENTS

Figure 1:
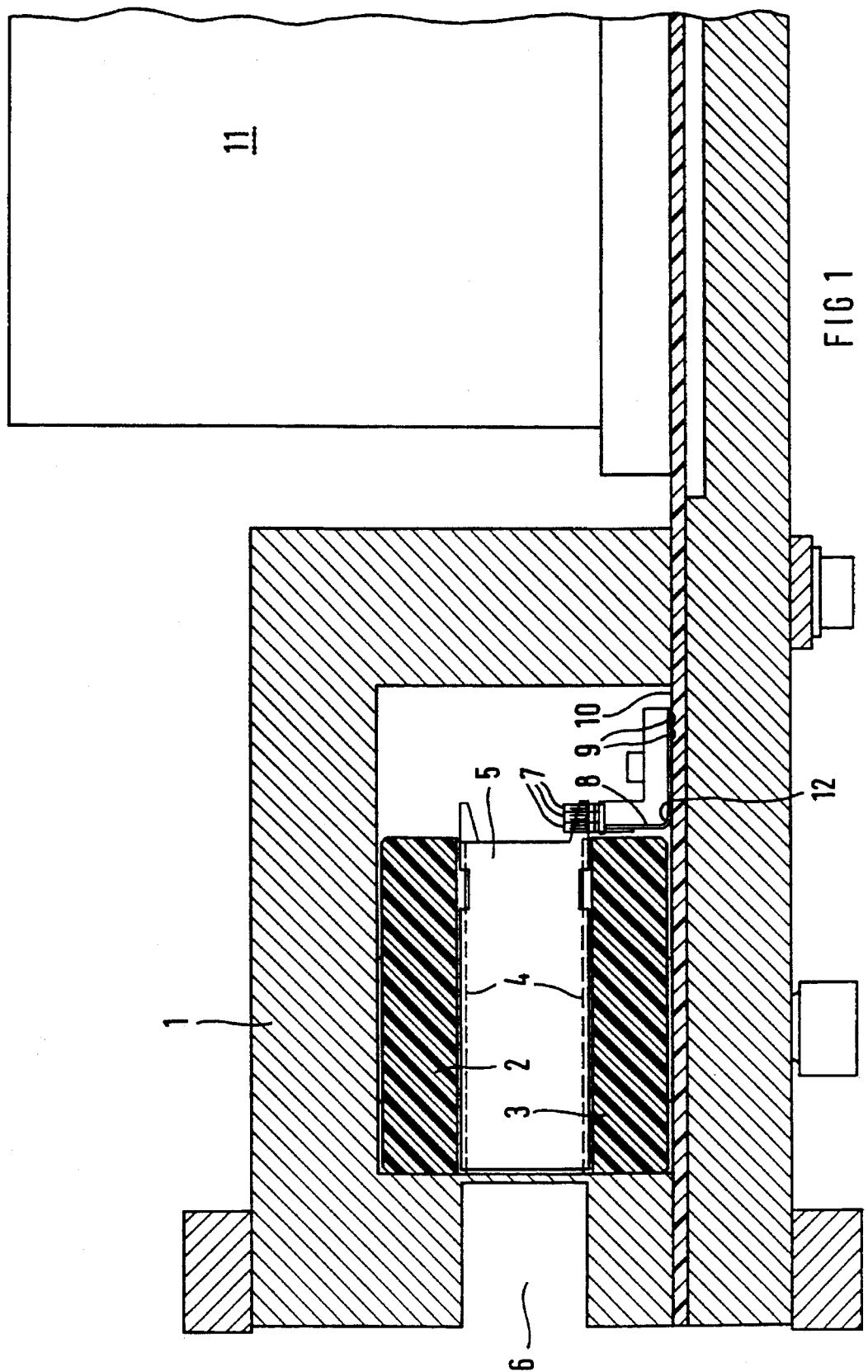
FIG. 1 is a cross section of a gas detector constructed in accordance with the principles of the present invention.

The inventive gas detector shown in FIG. 1 includes a gas-tight chamber 1 in which two retaining members 2 and 3 are disposed, the retaining members 2 and 3 being provided with parallel slots 4, in registry with each other, in which plate-shaped electrodes are arranged. The plate-shaped electrodes are aligned to the focus of an x-ray source (not shown). One of these electrodes can be seen in FIG. I and is referenced 5. The x-rays enter the detector through a window 6.

For tapping the electrical signals, the electrodes 5 are plugged in spring contacts 7. The spring contacts 7 are electrically connected to a conductor foil 8, which is bent by 90° and is pressed against a printed circuit board 10 with contact projections 9. As a result, an electrically conductive connection is assured between the contact projections 9 on the conductor foil 8 and the conductive pads on the printed circuit board 10. The printed circuit board 10 is contained gas-tight in the chamber 1, but has a portion extending to the exterior of the chamber 1, at which electronic components 11 are mounted, such as amplifiers for the signals from the electrodes 5. The electronic components 11 are electrically connected to the terminal pads on the printed circuit board 10, which are in contact with the contact projections 9, by means of conductor runs.

Figure 2:
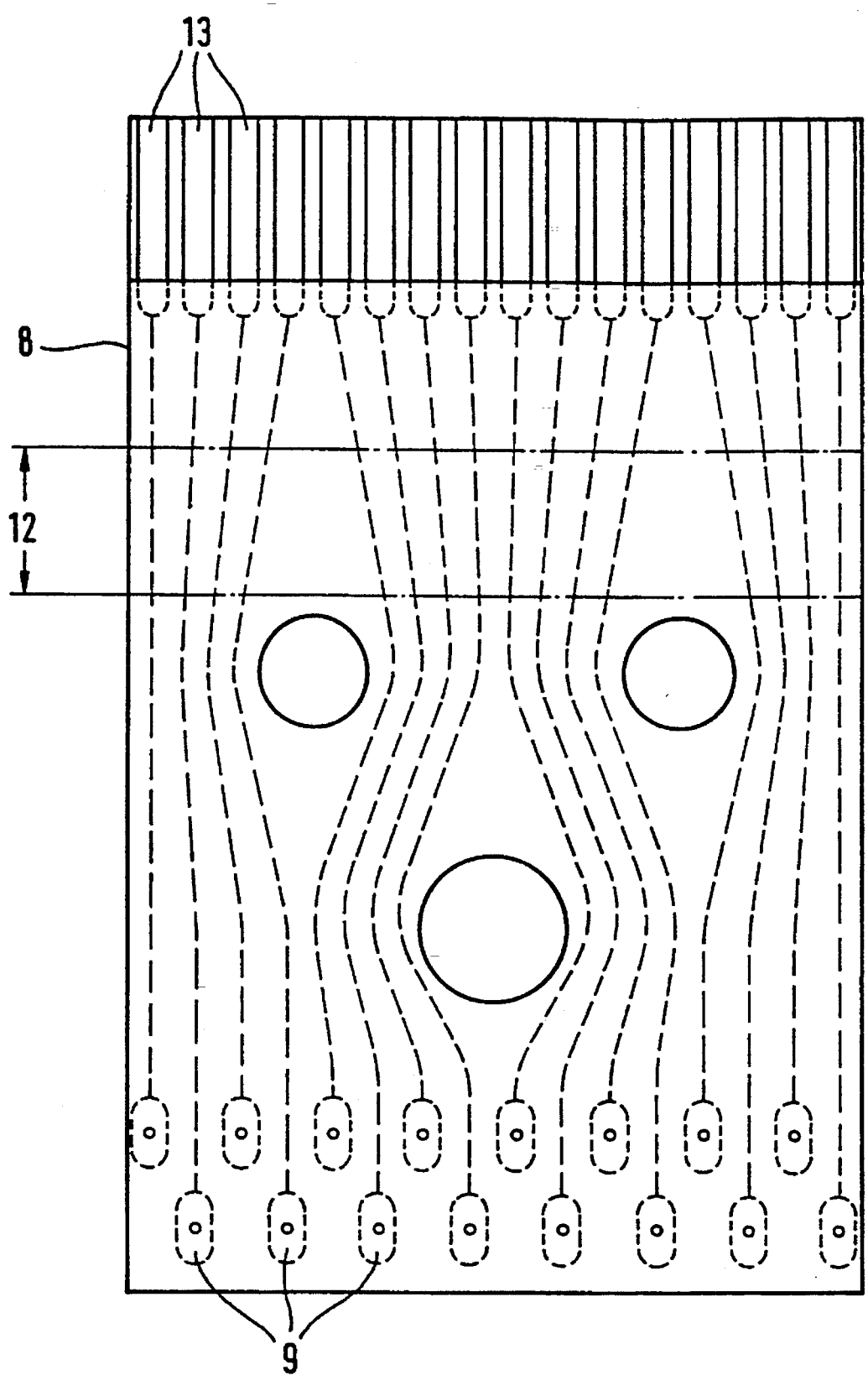
FIG. 2 shows a plan view of a conductor foil for use in the gas detector of FIG. 1.

The conductor foil 8 is shown in an elongated, plan view in FIG. 2. The region thereof which is bent in FIG. 1 is referenced 12 in FIG. 2. The conductor foil 8 carries solder pads 13 at one end for connection to the spring contacts 7 and two rows of contact projections 9 at the other end. In the exemplary embodiment shown in FIG. 2, a common conductor foil 8 is provided for sixteen electrodes 5.

The electrodes 5 can be glued to the retaining members 2 and 3 to form an integral packet.

In the embodiment described herein, a plurality of electrodes 5 are inserted into the holders 2 and 3 and are then screwed in place.

Although modifications and changes may be suggested by those skilled in the art, it is the intention of the inventors to embody within the patent warranted hereon all changes and modifications as reasonably and properly come within the scope of their contribution to the art.

We claim as our invention:

1. A gas detector for x-rays comprising:

a gas-tight chamber;

a row of electrically conductive spring contacts disposed in said gas-tight chamber;

a plurality of plate-shaped electrodes respectively plugged into said spring contacts in said gas-tight chamber, said spring contacts respectively conducting electrical signals from said electrodes;

a printed circuit board containing electronic components for processing said electrical signals; and a conductor foil having conductor runs electrically connected to said spring contacts and having conductor projections making electrical contact with conductor runs on said printed circuit board.

* * * * *